Nov. 30, 1937.  W. E. FOSTER  2,100,691
METHOD FOR THE CONDITIONING OF FLOUR
Filed July 17, 1935  2 Sheets-Sheet 1

INVENTOR
Waldo E. Foster
BY
Andrew K. Foulds
his ATTORNEY

Nov. 30, 1937.  W. E. FOSTER  2,100,691
METHOD FOR THE CONDITIONING OF FLOUR
Filed July 17, 1935  2 Sheets-Sheet 2

INVENTOR
Waldo E. Foster
BY
Andrew K. Foulds
his ATTORNEY

Patented Nov. 30, 1937

2,100,691

UNITED STATES PATENT OFFICE 2,100,691

METHOD FOR THE CONDITIONING OF FLOUR

Waldo E. Foster, Minneapolis, Minn.

Application July 17, 1935, Serial No. 31,886

2 Claims. (Cl. 83—42)

My invention relates to new and useful improvements in the control or regulation of the condition of the atmosphere in a segregated or enclosed space and more particularly to the treatment of material contained in the space, such for example as cereal grain. It is one object of my invention to provide a novel method for controlling or regulating the moisture content of material. My method also contemplates such control or regulation during processing or the performing of a manufacturing operation on the material. It is also an object of my invention to provide an apparatus for carrying the method into effect.

The invention consists in the novel method and the apparatus for performing the same, to be more fully described hereinafter and the novelty of which will be particularly pointed out and distinctly claimed.

In the accompanying drawings, to be taken as a part of this specification, I have fully and clearly illustrated an apparatus embodying my invention and by which my method can be performed, in which drawings—

Figure 1:
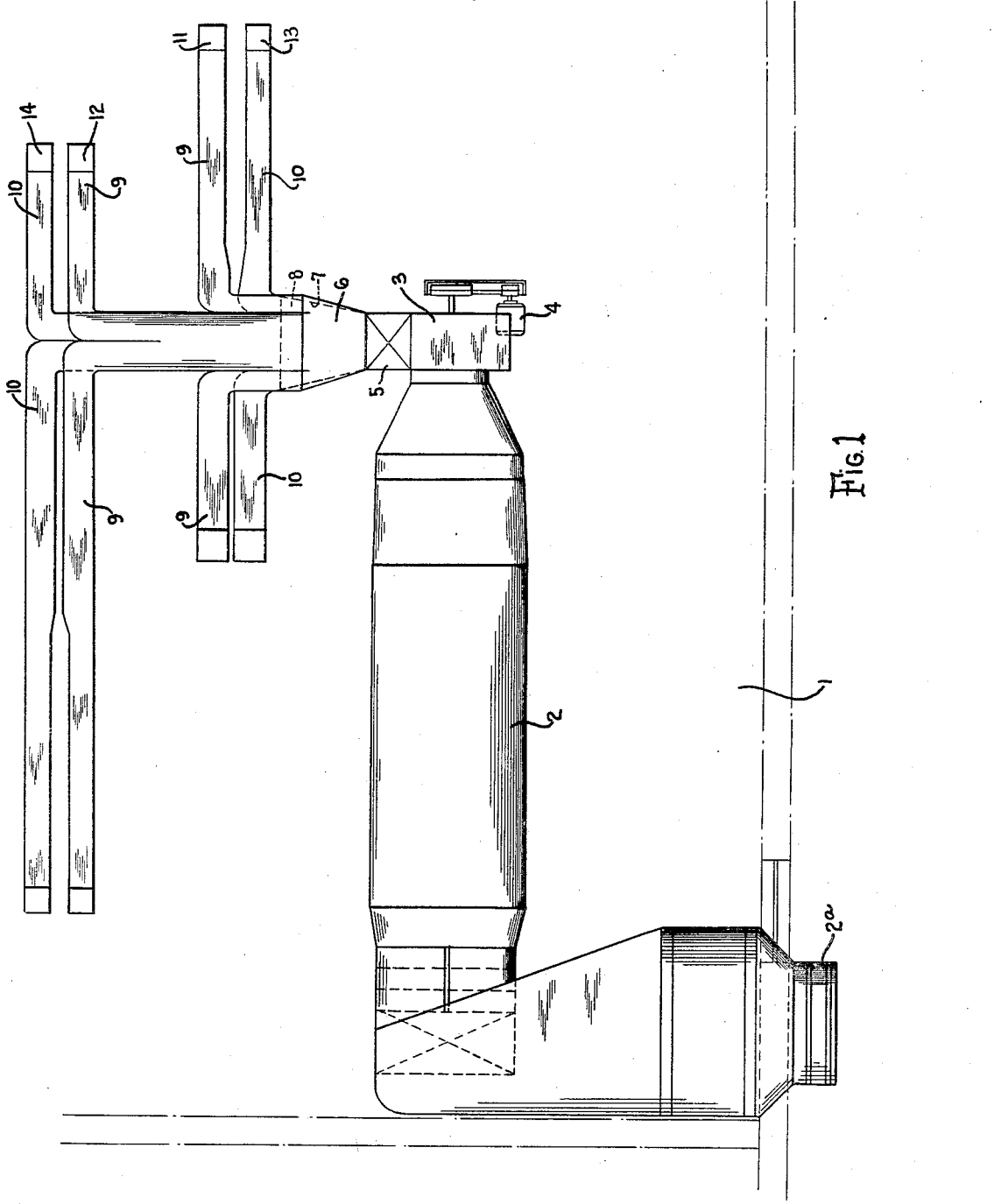
Figure 1 is a plan view of a portion of a floor of a mill building, showing certain of the apparatus embodying my invention.
Figure 2:
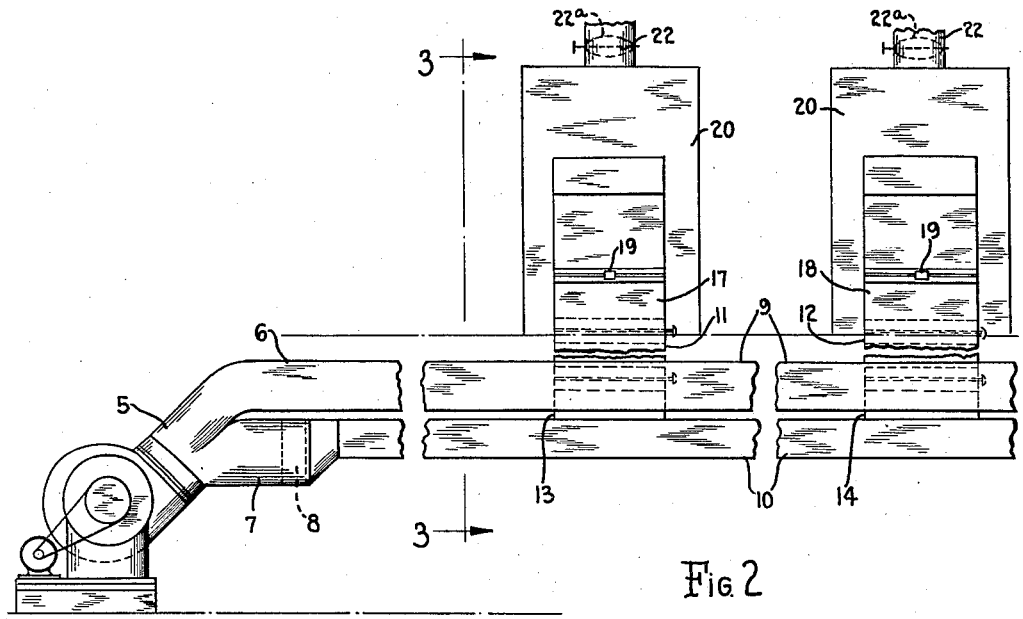
Fig. 2 is a detail view in elevation, showing a part of the apparatus of Fig. 1 and its operative relation and connection to certain of the mill machinery.
Figure 3:
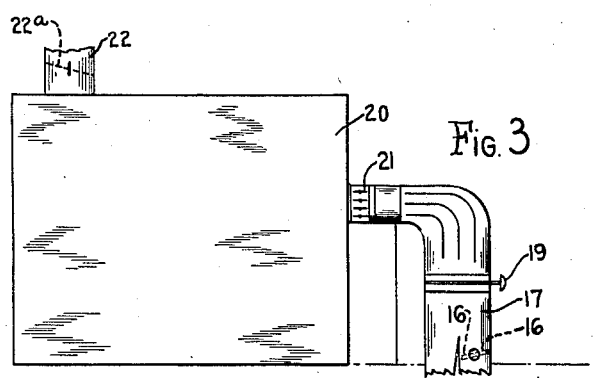
Fig. 3 is a view in section on the line 3—3 of Fig. 2.

Referring to the drawings by characters of reference, 1 designates generally the interior of a mill building wherein the grain is to be ground and within which is located any suitable air conditioning apparatus 2 which has an air inlet 2ᵃ for the supply of outside air to the apparatus 2 and which may also be provided with a return air inlet, not shown, but which is common in such apparatus. The outlet from the apparatus 2 discharges into the housing of a fan or blower 3 which may be driven by an electric motor 4 suitably geared thereto. The outlet of the fan is connected to an air delivery duct 5 which is divided at its outlet and discharges into separate branch ducts or conduits 6, 7. Within the duct 7 and preferably adjacent the main duct 5 there is a heater 8 which may be of any desired type which will efficiently heat the air passing through the duct 7. Communicating with the duct 6 there are a plurality of branch ducts 9 which may be of any number necessary to supply conditioned air to each of the separate pieces of the mill machinery. The duct 7 is likewise provided with a plurality of branch ducts 10 equal in number to the branch ducts 9 and each extending to the machinery in relatively close proximity to one of the ducts 9, so that the ducts 9, 10 are in pairs. The ducts 9, 10 are provided with suitable riser ducts which in Figs. 2 and 3 are designated 11, 12 respectively from duct 9, and 13, 14 respectively from duct 10. The riser ducts are each provided with a regulating damper, designated 15, for duct 13, and 16 for duct 11. Beyond or on the outlet side of the dampers 15, 16, the respective pairs of riser ducts, as 11—13 and 12—14, are joined to form common ducts 17, 18 which may each be provided with a volume controlling damper 19. The common duct 17 and other similar common ducts such as the duct 18, each opens into a casing or enclosing housing 20 which encloses and segregates from the surrounding atmosphere in the mill building one of the pieces or a portion of the mill machinery or apparatus such, for example, as crushing rolls or a screen or purifier. Each of the common ducts, as 17 and 18, may be provided with air deflecting or distributing vanes 21 positioned in their outlets and closely adjacent the inlet to the casings or housings 20. A plurality of vanes 21 is provided in the outlet from each common duct, the vanes being separately or independently adjustable so that the velocity and direction of the air discharging from the common duct may be controlled. Each of the casings 20 is also provided preferably in its top wall with an exhaust outlet 22 connected to suitable suction producing means, not shown, in order to withdraw foreign matter from the cereal which is being passed through and acted upon by the machinery in the casing. The exhaust outlet 22 is preferably provided with a controlling damper 22ᵃ which may be adjusted in conjunction with the inlet controlling dampers and the vanes 21 to maintain in the casing pressure either above or below atmospheric pressure, depending upon the particular operation being performed in the casing. All of the ducts or conduits which extend from the fan or blower 3 are preferably insulated with suitable heat insulating material throughout their lengths and to their connections to their respective casings or housings 20 in order to prevent transfer or interchange of heat between the air in the ducts or conduits and the surrounding atmosphere or the air in the space through which the ducts or conduits extend and to which the external surfaces of the ducts or conduits are exposed.

Figure 4:
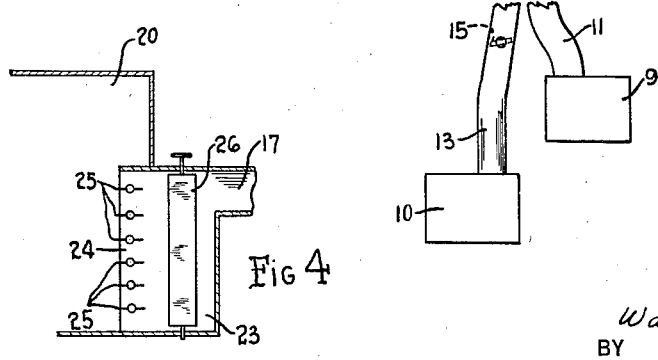
Fig. 4 is a detail view in section of a modification of part of the apparatus.

In Figure 4, the common duct 17 opens into a plenum chamber 23 preferably positioned in the wall of casing 20. In the chamber 23 and controlling the discharge of air from the outlet 24 thereof into casing 20, there are a plurality of horizontally journaled louvers or damper plates 25 which are independently or separately adjustable to regulate the velocity of discharge and the pressure in casing 20. These vanes or dampers 25 also serve as a deflecting means to control the vertical distribution of the air admitted to the interior of the casing 20. Also in the chamber 23 there is a row of cooperating vertically journaled dampers or louvers 26 which are independently or separately adjustable to regulate the velocity of air discharging from chamber 23 and the pressure in casing 20, and which are also operable to control the horizontal distribution of the air discharging into casing 20. It will be apparent that the louvers 25 and 26 together provide for universal control of the direction of the air discharging into the casing 20. The dampers or louvers 25, 26 may also be utilized to control the volume of air supplied to the interior of the casings 20. The chamber 23 serves to control the velocity of the air supplied to the casing 20 and preferably acts to reduce the velocity of the air discharging from the common duct 17.

In carrying out my method, the operation of the above described apparatus is as follows: The fan or blower 3 is placed in operation to draw a stream of air to be conditioned into and through the air treating or conditioning apparatus 2 which is adjusted or regulated in conformity with common practice in the treatment or conditioning of air to provide air at the outlet end of the apparatus which may be but is not necessarily saturated or at 100% relative humidity and which may have a dew-point and dry bulb temperature of say 63½° F. The treated air stream leaving the fan 3 is divided by the branch ducts 6, 7 into two main portions or substreams. The portion of the main air stream which enters the duct 6 is, due to the duct insulation, supplied to the common duct 17, for example, at substantially the same relative humidity at which it leaves apparatus 2 but may be of slightly less relative humidity due to the slight temperature increase resulting from friction of the air as it flows through the ducts or conduits. The portion of the main air stream which enters duct 7 is heated by the heater 8 to raise the dry bulb temperature of the air in duct 6. The portion of the air stream in duct 7 may be heated to say 120° F., for example. Due to the insulation of the duct 7 and its communicating branch ducts the heated portion of the air stream will be delivered at the common duct 17, for example, at substantially the same dry bulb temperature and relative humidity at which it leaves the heater 8. The divided main stream is delivered to the common duct 17 to be reunited therein in predetermined proportions controlled by the dampers 15 and 16. The cereal grain to be ground or milled is, in accordance with the usual mill practice, fed or passed through a plurality of successive milling stages or operations. The grain as received at the mill may vary in moisture content depending upon the kind of grain, the year in which it is grown and even seasons of the same year, and also the location or district wherein the grain is grown. Obviously, the finished product, such as flour, will not be uniform over a period of time if the grain is milled as received due to variation in the moisture content of the grain. In order to obtain a product having a desired moisture content or re-gain, it is therefore necessary to add moisture to or withdraw moisture from the grain. Accordingly, as the grain is fed or passed through the milling machinery within the successive casings or housings 20, the operator in charge of the particular operation being performed in a particular casing or housing 20 determines the actual moisture content of the grain being or to be operated upon therein. He then regulates the dampers 15 and 16 in accordance with the actual moisture content to provide air in that casing of a predetermined desired relative humidity in accordance with the dry bulb temperature of the air in order to regulate the moisture content which the grain or product will have upon completion of the milling operation performed in that particular casing or housing 20. If, for example, it is desired that the finished product have a moisture content of 14% and it is found that the grain passing through a particular step in one of the casings is of less per cent re-gain, the damper 16 controlling the relatively moist air will be moved further open or the damper 15 controlling the heated air will be moved further closed or the dampers will both be so moved in order to increase the relative humidity of the air within the housing or casing and to which the grain is exposed, thereby increasing the per cent re-gain of the material or product leaving that casing. Obviously, if the per cent re-gain is above the desired per cent, the damper 15 or the damper 16 or both will be adjusted respectively in a reverse manner to decrease the relative humidity of the air supplied to the casing 20 thereby to reduce the per cent re-gain in the finished product.

It will be apparent from the foregoing that by my method the moisture content of the finished product can be readily controlled due to the independent regulation of the condition of the air to which the grain is exposed during each step in the milling process. It will also be apparent that different kinds of grain which require separate milling or the same or different kinds of grain having different contents of moisture may be simultaneously milled in the same building since the relative humidity or the condition of the air to which the grain is exposed during each step in the milling thereof can be accurately and independently controlled.

What I claim and desire to secure by Letters Patent of the United States is:

1. In a method of conditioning flour, consisting of the steps of processing grain of variable humidity content progressively by stages, and having a variable moisture content in the various stages, comprising treating the grain in each of the various stages within closed receptacles as follows: conditioning air remote from said grain processing stages to substantial saturation, dividing said air into a plurality of streams; treating one of said streams by heating it to change its relative humidity, whereby one stream contains air substantially saturated with moisture and the other contains air of a less degree of saturation; moving both streams of air to a processing stage; regulating the relative humidity of the air before admission to said stage according to the moisture content of the grain in said receptacle by mixing the streams in various amounts so that there is no free moisture in the mixed air, and conducting the mixture to at least one of said closed receptacles.

2. In a method of conditioning flour, consisting of the steps of processing grain of variable moisture content into flour; (a) saturating all of the incoming air passing to an enclosed flour machine; (b) by-passing a portion of said saturated air before applying to the grain process; (c) changing the dry bulb temperature of the by-passed portion of the air by heating the same, and thereafter re-uniting it in variable amounts with the saturated air at a sufficient distance from the point of introduction to the enclosed flour machine to bring about a thorough mixture of the two streams so that the mixed stream is of uniform relative humidity to thereby regulate the humidity of the mixed stream adjacent the machine so that there is no free moisture in the mixed air; and (d) then applying the mixed stream to the contents of the machine processing the flour.

WALDO E. FOSTER.